US010548328B2

(12) United States Patent
Forman et al.

(10) Patent No.: US 10,548,328 B2
(45) Date of Patent: Feb. 4, 2020

(54) ANTISTALING PROCESS FOR FLAT BREAD

(71) Applicant: Novozymes North America, Inc., Franklinton, NC (US)

(72) Inventors: Todd Michael Forman, Franklinton, NC (US); Daniel N. Evanson, Franklinton, NC (US)

(73) Assignee: Novozymes North America, Inc., Franklinton ( * ) Notice: Subject to any disclaimer, the term of this patent is extended or adjusted under 35 U.S.C. 154(b) by 0 days.

(21) Appl. No.: 14/977,936

(22) Filed: Dec. 22, 2015

(65) Prior Publication Data

US 2016/0113295 A1   Apr. 28, 2016

Related U.S. Application Data

(63) Continuation of application No. 13/203,934, filed as application No. PCT/US2010/032233 on Apr. 23, 2010, now abandoned.

(60) Provisional application No. 61/172,515, filed on Apr. 24, 2009.

(51) Int. Cl.
*A21D 8/04* (2006.01)

(52) U.S. Cl.
CPC .................... *A21D 8/042* (2013.01)

(58) Field of Classification Search
CPC ....................................................... A21D 8/042
See application file for complete search history.

(56) References Cited

U.S. PATENT DOCUMENTS

| | | | |
|---|---|---|---|
| 3,946,856 | A | 3/1976 | Herrera |
| 5,059,430 | A | 10/1991 | Bowles |
| 5,162,210 | A | 11/1992 | Sierks et al. |
| 6,270,813 | B1 | 8/2001 | Nielsen |
| 6,365,204 | B1 | 4/2002 | Spendler |
| 7,244,597 | B2 | 7/2007 | Veit et al. |
| 2004/0091596 | A1 | 5/2004 | Schellhaass et al. |
| 2006/0148054 | A1 | 7/2006 | Fukuyama et al. |
| 2008/0009049 | A1 | 1/2008 | Viksoe-Nielsen |
| 2011/0177223 | A1 | 7/2011 | Mulder et al. |

FOREIGN PATENT DOCUMENTS

| | | |
|---|---|---|
| CN | 1297199 | 5/2001 |
| CN | 1533697 | 10/2004 |
| EP | 1541028 A1 | 6/2005 |
| GB | 2400012 A | 10/2004 |
| GB | 2417184 A | 2/2006 |
| IN | 200700710 | 11/2008 |
| MX | 9502200 | 5/1995 |
| WO | 199104669 A1 | 4/1991 |
| WO | 1999053769 A1 | 10/1999 |
| WO | 200059307 A1 | 10/2000 |
| WO | 2005003311 A2 | 1/2005 |
| WO | 2005066338 A1 | 7/2005 |
| WO | 2006066579 A1 | 6/2006 |
| WO | 2009148467 A1 | 12/2009 |
| WO | 2010124206 A1 | 10/2010 |

OTHER PUBLICATIONS

STIC sequence search performed for sequences in parent U.S. Appl. No. 13/203,934 on May 2013. pp. 1-654.*
"Protein of the Month—D-amylase". Available online from Interpro as of 2006:www.ebi.ac.uk/interpro/potm/2006-2. pp. 1-3.*
Aida et al, 1996, Int J. Food Sci Tech, vol. 31, pp. 505-509.
Alviola et al, Cereal Chem, 2008, vol. 85, No. 3, pp. 391-396.
Gujral et al, J Food Eng, 2004, vol. 65, pp. 89-94.
Gujral et al, 2002, Journal of Food Engineering, vol. 55, pp. 173-179.
Haridas et al, 2003, Chapatis and Related Products, pp. 1033-1044.
Hemalatha et al, 2010, Food Sci Tech, vol. 43, pp. 1394-1402.
Indrani et al, Journal of Texture Studies, 2006, vol. 37, pp. 315-338.
Jennifer Mcdowal, 2006, Interpo Prot of the Month, Alpha-Amylase, pp. 1-3.
Jagannath et al, 1999, Food Chemistry, vol. 64, pp. 571-576.
Koocheki et al, 2009, J Food Proc Eng. vol. 32, pp. 187-205.
Lauriston et al, 1996, Brewery Gelatinization Temperature, p. 1.
Novozymes Fungamyl, 2010, pp. 1-2.
Prabhasankar et al, 2004, Journal of the Science of Food and Agriculture, vol. 84, pp. 2128-2134.
Rao, 2003, Encyclopedia Food Sci Tech Nutrition, pp. 795-801.
Shaikh et al, 2008, J Food Proc Preserv, vol. 32, pp. 378-403.

* cited by examiner

*Primary Examiner* — Jenna A Watts
(74) *Attorney, Agent, or Firm* — Kelly Reynolds

(57) ABSTRACT

The present invention relates to a process for retarding the staling of flat breads, as well as flat breads obtainable by the method of the invention.

15 Claims, No Drawings
Specification includes a Sequence Listing.

SEQUENCE LISTING

```
<160> NUMBER OF SEQ ID NOS: 1

<210> SEQ ID NO 1
<211> LENGTH: 558
<212> TYPE: PRT
<213> ORGANISM: Artificial
<220> FEATURE:
<223> OTHER INFORMATION: Rhizomucor pusillus amylase with linker and SBD
      from A. rolfsii
<220> FEATURE:
<221> NAME/KEY: mat_peptide
<222> LOCATION: (1)..(558)

<400> SEQUENCE: 1

Ser Pro Leu Pro Gln Gln Gln Arg Tyr Gly Lys Arg Ala Thr Ser Asp
1               5                   10                  15
```

```
Asp Trp Lys Ser Lys Ala Ile Tyr Gln Leu Leu Thr Asp Arg Phe Gly
         20                  25                  30

Arg Ala Asp Asp Ser Thr Ser Asn Cys Ser Asn Leu Ser Asn Tyr Cys
             35                  40                  45

Gly Gly Thr Tyr Glu Gly Ile Thr Lys His Leu Asp Tyr Ile Ser Gly
 50                  55                  60

Met Gly Phe Asp Ala Ile Trp Ile Ser Pro Ile Pro Lys Asn Ser Asp
65                   70                  75                  80

Gly Gly Tyr His Gly Tyr Trp Ala Thr Asp Phe Tyr Gln Leu Asn Ser
                 85                  90                  95

Asn Phe Gly Asp Glu Ser Gln Leu Lys Ala Leu Ile Gln Ala Ala His
            100                 105                 110

Glu Arg Asp Met Tyr Val Met Leu Asp Val Val Ala Asn His Ala Gly
            115                 120                 125

Pro Thr Ser Asn Gly Tyr Ser Gly Tyr Thr Phe Gly Asp Ala Ser Leu
            130                 135                 140

Tyr His Pro Lys Cys Thr Ile Asp Tyr Asn Asp Gln Thr Ser Ile Glu
145                 150                 155                 160

Gln Cys Trp Val Ala Asp Glu Leu Pro Asp Ile Asp Thr Glu Asn Ser
                165                 170                 175

Asp Asn Val Ala Ile Leu Asn Asp Ile Val Ser Gly Trp Val Gly Asn
            180                 185                 190

Tyr Ser Phe Asp Gly Ile Arg Ile Asp Thr Val Lys His Ile Arg Lys
            195                 200                 205

Asp Phe Trp Thr Gly Tyr Ala Glu Ala Ala Gly Val Phe Ala Thr Gly
210                 215                 220

Glu Val Phe Asn Gly Asp Pro Ala Tyr Val Gly Pro Tyr Gln Lys Tyr
225                 230                 235                 240

Leu Pro Ser Leu Ile Asn Tyr Pro Met Tyr Tyr Ala Leu Asn Asp Val
                245                 250                 255

Phe Val Ser Lys Ser Lys Gly Phe Ser Arg Ile Ser Glu Met Leu Gly
                260                 265                 270

Ser Asn Arg Asn Ala Phe Glu Asp Thr Ser Val Leu Thr Thr Phe Val
            275                 280                 285

Asp Asn His Asp Asn Pro Arg Phe Leu Asn Ser Gln Ser Asp Lys Ala
            290                 295                 300

Leu Phe Lys Asn Ala Leu Thr Tyr Val Leu Leu Gly Glu Gly Ile Pro
305                 310                 315                 320

Ile Val Tyr Tyr Gly Ser Glu Gln Gly Phe Ser Gly Gly Ala Asp Pro
                325                 330                 335

Ala Asn Arg Glu Val Leu Trp Thr Thr Asn Tyr Asp Thr Ser Ser Asp
            340                 345                 350

Leu Tyr Gln Phe Ile Lys Thr Val Asn Ser Val Arg Met Lys Ser Asn
            355                 360                 365

Lys Ala Val Tyr Met Asp Ile Tyr Val Gly Asp Asn Ala Tyr Ala Phe
            370                 375                 380

Lys His Gly Asp Ala Leu Val Val Leu Asn Asn Tyr Gly Ser Gly Ser
385                 390                 395                 400

Thr Asn Gln Val Ser Phe Ser Val Ser Gly Lys Phe Asp Ser Gly Ala
                405                 410                 415

Ser Leu Met Asp Ile Val Ser Asn Ile Thr Thr Thr Val Ser Ser Asp
            420                 425                 430
```

-continued

```
Gly Thr Val Thr Phe Asn Leu Lys Asp Gly Leu Pro Ala Ile Phe Thr
        435                 440                 445

Ser Ala Gly Ala Thr Ser Pro Gly Gly Ser Ser Gly Ser Val Glu Val
    450                 455                 460

Thr Phe Asp Val Tyr Ala Thr Thr Val Tyr Gly Gln Asn Ile Tyr Ile
465                 470                 475                 480

Thr Gly Asp Val Ser Glu Leu Gly Asn Trp Thr Pro Ala Asn Gly Val
                485                 490                 495

Ala Leu Ser Ser Ala Asn Tyr Pro Thr Trp Ser Ala Thr Ile Ala Leu
            500                 505                 510

Pro Ala Asp Thr Thr Ile Gln Tyr Lys Tyr Val Asn Ile Asp Gly Ser
        515                 520                 525

Thr Val Ile Trp Glu Asp Ala Ile Ser Asn Arg Glu Ile Thr Thr Pro
    530                 535                 540

Ala Ser Gly Thr Tyr Thr Glu Lys Asp Thr Trp Asp Glu Ser
545                 550                 555
```

ANTISTALING PROCESS FOR FLAT BREAD

CROSS-REFERENCE TO RELATED APPLICATIONS

This application is a continuation of Ser. No. 13/203,934 filed Aug. 30, 2011, which is a 35 U.S.C. 371 national application of PCT/US2010/32233 filed Apr. 23, 2010, which claims priority or the benefit under 35 U.S.C. 119 of U.S. provisional application No. U.S. 61/172,515 filed Apr. 24, 2009, the contents of which are fully incorporated herein by reference.

SEQUENCE LISTING

Applicants also submit herewith a Sequence Listing in the form of a text file. The text file acts as both the paper copy and the computer readable form of the Sequence Listing.

FIELD OF THE INVENTION

The present invention relates to a process for retarding the staling of flat breads, as well as flat breads obtainable by the method of the invention.

BACKGROUND OF THE INVENTION

In the bread-making process it is known to add bread-improving and/or dough-improving additives to the bread dough, the action of which, inter alia, results in improved texture, volume, flavor and freshness of the bread as well as improved machinability of the dough.

In recent years a number of enzymes have been used as dough and/or bread improving agents, particularly enzymes which act on components present in large amounts in the dough. Various amylases have been suggested for retarding the staling by the addition to dough. For example, WO 91/04669 discloses the use of a maltogenic alpha-amylase from *B. stearothermophilus* to retard staling. This enzyme is commercially available from Novozymes A/S under the tradename NOVAMYL®. WO 00/59307 describes the use of an exo-amylase which hydrolyzes starch to form mainly maltotriose to retard staling. GB 2417184 describes processes for preparation of wheat tortilla dough and wheat tortilla comprising an exoamylase, amongst other ingredients.

However, baked products such as flat bread provide additional challenges in retarding staling. For example, traditional amylases and NOVAMYL®-type amylases require longer baking times to allow sufficient starch modification and are therefore less amenable to the rapid baking time of flat bread.

It is therefore desirable to have alternative ingredients that can provide the above-mentioned functionality.

It is an object of the present invention to provide such alternatives.

SUMMARY OF THE INVENTION

The present invention relates to methods for preparing dough used to prepare flat breads and flat bread enzymatic compositions. In accordance with the present invention, the shelf life (storage stability) of flat bread can be extended by enzymatic treatment methods to dough used to prepare the flat bread. The enzymatic treatment methods of the present invention retard (slow) the staling of flat bread products. The enzymatic treatment methods of the invention substantially improve the storage properties of the flat bread products.

The present invention provides a method for preparing a flat bread dough used to prepare flat bread comprising treating a dough used to prepare a flat bread with one or more raw starch degrading enzymes. In one embodiment, the raw starch degrading enzyme is an acid alpha-amylase.

In one embodiment, the invention relates to flat bread obtainable by the method of the invention.

The present invention also relates to dough and bread improving compositions comprising the enzyme combinations of the present invention and one or more dough or bread ingredients, e.g., flour.

DETAILED DESCRIPTION OF THE INVENTION

Flat Bread and Flat Bread Dough Compositions

As used herein, "flat bread" means a bread prepared from a flattened dough, and which has a thickness of one millimeter to a few centimeters. A flat bread may be made from a simple mixture of flour, water, and salt and then thoroughly rolled into flattened dough. In one embodiment, the flat bread is unleavened, i.e., made without yeast. In another embodiment, the flat bread is made with yeast, such as flat bread made with whole wheat flour or refined flour. The flat bread may include further optional ingredients, such as olive oil, sesame oil, vegetables, spices, pepper, and the like. The flat bread may also include additional ingredients as set forth below.

Flat breads also have a very quick baking time (often <1 minute).

Examples of flat breads include tortilla, pita, Arabic bread, Indian flat bread (IFB). Further non-limiting examples include lavash, baladi, barbari, Sangak, tanoor, taftoon, shami, halabi, mafrood, burr, bairuti, pocket bread, naan, phulka, chapatti, and paratha. The flat bread includes, for example wheat flour tortilla and chapatti. In a particular embodiment the flat bread product is a tortilla. In a particular embodiment the flat bread product is a chapatti.

As used herein "flat bread dough" means any dough used to prepare a flat bread. The dough used to prepare a flat bread product may be made from any suitable flour source, e.g., flour sourced from grains, such as, wheat flour, corn flour, rye flour, barley flour, oat flour, rice flour, or sorghum flour, potato flour, soy flour, flour from pulses and combinations thereof (e.g., wheat flour combined with one of the other flour sources; rice flour combined with one of the other flour sources). The flat bread is generally made from, or at least contains a certain amount of, wheat flour.

Any flat bread process may be used to prepare the flat bread. Methods for preparing flat bread are well known in the art and are disclosed, for example, in Qarooni, "Wheat Flour Tortillas," AIB Research Department Technical Bulletin, Volume XV, Issue 5, pp. 1-8 (May 1993) and Kenneth J. Quail, Arabic Bread Production, published by American Association of Cereal Chemists, Inc., St. Paul, Minn., non-limiting examples of which are provided under the "Materials and Methods" section below. In one particular embodiment, the flat bread is a tortilla or an IFB, prepared by a hot press, hand-stretch or die-cut procedure. The process of preparing flat bread generally involves the sequential steps of dough making (with an optional proofing step), sheeting or dividing, shaping or rolling, and proofing, the dough, which steps are well known in the art. If the optional proofing step is used, preferably more flour is added and alkali may be added to neutralize acid produced or to be produced during the second proofing step. When it is leavened, the dough is generally leavened by the addition of a suitable yeast culture, for example, a culture of *Saccharomyces cerevisiae* (baker's yeast) or a chemical leavening agent, as are well-known in the art. Chemical leavening can include, e.g., baking soda and baking powders (both single acting and double acting), as is well-known in the art.

In addition to preparing fresh flat bread dough or flat bread products, the present invention is directed to a method for preparing flat bread dough that can be stored, e.g., at room temperature or with refrigeration, prior to baking. The dough is stored after preparation of the dough and treatment by the enzyme combinations of the present invention (i.e., prior to baking). This may be advantageous for storage and/or distribution. An example of a method for preparing a flat bread dough that can be stored prior to baking includes the steps of making a dough (with an optional proofing), sheeting or dividing, shaping or rolling, proofing, and storing the dough. The present invention is also directed to a flat bread dough that can be stored prior to baking comprising the enzyme combinations of the present invention.

In addition to preparing fresh flat bread dough or flat bread products, the present invention is directed to a method for preparing a frozen flat bread dough. The dough is frozen after preparation of the dough and treatment by the enzyme combinations of the present invention (i.e., prior to baking). A frozen flat bread dough may be advantageous for storage and/or distribution. An example of a method for preparing a frozen flat bread dough includes the steps of making a dough (with an optional proofing), sheeting or dividing, shaping or rolling, proofing, and freezing the dough. The present invention is also directed to a frozen flat bread dough comprising the enzyme combinations of the present invention. In one embodiment, the invention provides a method for preparing a flat bread composition, comprising adding one or more raw starch degrading enzymes to a dough used to prepare flat bread. In another embodiment, the method further comprises baking the dough to make flat bread.

In one embodiment, the invention provides a method for preparing a flat bread composition comprising making a dough comprising one or more raw starch degrading enzymes and proofing the dough. In another embodiment, the method further comprises baking the dough to prepare a flat bread.

In one embodiment, the invention provides a method for preparing a flat bread composition comprising making a dough comprising one or more raw starch degrading enzymes, proofing the dough and baking the dough to prepare a flat bread.

According to one embodiment, the invention provides a method for preparing a flat bread composition comprising making a dough comprising one or more raw starch degrading enzymes, proofing, sheeting or dividing and shaping or rolling the dough. In another embodiment, the method further comprises baking the dough to prepare a flat bread.

According to one embodiment, the invention provides a method for preparing a flat bread composition comprising making a dough comprising one or more raw starch degrading enzymes, proofing, sheeting or dividing and shaping or rolling the dough, and baking the dough to prepare a flat bread.

In one embodiment, the invention provides a method for retarding the staling of a baked flat bread product comprising adding one or more raw starch degrading enzymes to either a flour that is used to form a dough or directly to a dough in an amount to retard the staling of the baked flat bread and baking the dough to form the baked flat bread product.

Industrial Processes

The present invention is particularly useful for preparing flat bread dough and flat bread products in industrialized processes, that is, in which the dough used to prepare flat bread and/or flat bread products are prepared mechanically using automated or semi-automated equipment. The present invention provides significant advantages in that flat bread can now be prepared using automated or semi-automated processes in which the flat bread is stored for distribution and consumer use more than 24 hours after preparation yet substantially maintains the qualities of flat bread prepared freshly on the same day.

The process of preparing flat bread generally involves the sequential steps of dough making (with an optional proofing step), sheeting or dividing, shaping or rolling, and proofing, the dough, which steps are well known in the art. If the optional proofing step is used, preferably more flour is added and alkali may be added to neutralize acid produced or to be produced during the second proofing step. In an industrial flat bread production process according to the present invention, one or more of these steps is/are performed using automated or semi-automated equipment.

Enzymes

The present invention is directed to methods and compositions for preparing dough used to prepare flat breads and methods for preparing flat breads by applying specific enzyme combinations to a dough used to prepare flat breads. The enzyme combination comprises one or more raw starch degrading enzymes.

Flat breads have a very quick baking time (often <1 minute). Traditional amylases and NOVAMYL-type amylases require that a significant amount of the available starch be either gelatinized or somehow "opened up" to allow the enzyme to modify it in a way that fresh baked properties are preserved. Especially in the case of wheat based flat breads, the rapid baking time may be insufficient to allow sufficient starch modification. Without wishing to be bound by theory, it is believed that according to the present invention, raw starch degrading enzymes allow the starch to be properly modified prior to baking.

Raw Starch Degrading Enzyme

As used herein, a "raw starch degrading enzyme" (also known as a raw starch hydrolyzing enzyme) refers to an enzyme or combination of enzymes that can directly degrade raw starch granules below the gelatinization temperature of starch. The gelatinization temperature of starch can range from 51° C. to 78° C. as the gelatinization initiation temperature can vary from about 51° C. to 68° C. A raw starch degrading enzyme is an enzyme that can directly degrade raw starch granules under the following conditions: When wheat flour is used to make the dough, the raw starch degrading enzyme can directly degrade raw starch when the gelatinization temperature is 52° C. to 75° C. When corn flour is used to make the dough, the raw starch degrading enzyme can directly degrade raw starch when the gelatinization temperature is 62° C. to 74° C. When rye flour is used to make the dough, the raw starch degrading enzyme can directly degrade raw starch when the gelatinization temperature is 55° C. to 70° C. When barley flour is used to make the dough, the raw starch degrading enzyme can directly degrade raw starch when the gelatinization temperature is 53° C. to 63° C. When oat flour is used to make the dough, the raw starch degrading enzyme can directly degrade raw starch when the gelatinization temperature is 55° C. to 62°

C. When rice flour is used to make the dough, the raw starch degrading enzyme can directly degrade raw starch when the gelatinization temperature is 65° C. to 75° C. When sorghum flour is used to make the dough, the raw starch degrading enzyme can directly degrade starch when the gelatinization temperature is 70° C. to 78° C. When potato starch is used to make the dough, the raw starch degrading enzyme can directly degrade starch when the gelatinization temperature is 56° C. to 69° C.

In one embodiment, the raw starch degrading enzyme is defined as an enzyme that has a raw starch degrading index of at least 0.2, at least 0.3, at least, 0.4, at least 0.5, at least 0.6, at least 0.7, at least 0.8, at least 0.9, at least 1, at least 1.1, at least 1.2, at least 1.3, at least 1.4, at least 1.5, at least 1.6, at least 1.7, at least 1.8, at least 1.9, at least 2, wherein the raw degrading index is a ratio of activity to degrade raw starch to activity to degrade gelatinized starch (Ra/Ga). Preferably, the raw starch degrading enzyme is defined as an enzyme that has a raw starch degrading index of higher than 1. The activity on gelatinized starch is measured by measuring the release of glucose produced by the enzyme on a 2% gelatinized (e.g., corn) starch reaction mixture. The activity is measured by the release of reducing sugars produced in 4 mol per hour per mg of pure active enzyme. The same assay can then be used to measure the activity of the enzyme on raw starch, but substituting the 2% gelatinized (e.g., corn) starch by 2% of raw (e.g., corn) starch. In both assays, the temperature is 40° C., the same pH and buffer solution is used and the incubation time is 6 hours, and is further described in the "Materials and Methods" section below.

Raw starch degrading enzymes are ubiquitous and produced by plants, animals, and microorganisms, such as, fungal, bacterial and yeast raw starch degrading enzymes. In embodiments, raw starch degrading enzymes include one or more glucoamylases. In another embodiment, raw starch degrading enzymes include one or more alpha-amylases. In yet another embodiment, raw starch degrading enzymes is a combination of one or more alpha-amylases and one or more glucoamylases. Sources of raw starch degrading enzymes, include enzymes obtained from *Aspergillus*, such as, *Aspergillus oryzae*, *Aspergillus niger* and *Aspergillis kawachii* alpha-amylases. Example of such raw starch degrading enzymes include the raw starch degrading enzymes described in WO 2005/003311, WO 2006/0692, WO 2006/060289 and WO 2004/080923.

In one embodiment, the raw starch degrading enzymes comprises an acid alpha-amylase. An "acid alpha-amylase" is an alpha-amylase (4-α-D-glucan glucanohydrolase, E.C. 3.2.1.1) which when added in an effective amount has activity at a pH in the range of 3.0 to 7.0, preferably from 3.5 to 6.0, or more preferably from 4.0-5.0.

A source of a raw starch degrading acid alpha-amylase is the acid alpha amylase from *Aspergillus niger* disclosed as "AMYA_ASPNG" in the Swiss-prot/TeEMBL database under the primary accession no. P56271 and described in more detail in WO 89/01969 (Example 3). The *Aspergillus niger* acid alpha-amylase is also shown as SEQ ID NO: 1 in WO 2004/080923 (Novozymes A/S). A suitable commercially available acid fungal alpha-amylase derived from *Aspergillus niger* is the product SP288 (SEQ ID NO:1 of U.S. Pat. No. 7,244,597) (available from Novozymes A/S). Other sources of acid alpha-amylases include those derived from a strain of the genera *Rhizomucor* and *Meripilus*, such as, a strain of *Rhizomucor pusillus* (WO 2004/055178) or *Meripilus giganteus*. In yet another embodiment, the acid alpha-amylase is derived from *Aspergillus kawachii* and is disclosed by Kaneko et al. J. Ferment. Bioeng. 81:292-298 (1996) "Molecular-cloning and determination of the nucleotide-sequence of a gene encoding an acid-stable alpha-amylase from *Aspergillus kawachii*"; and further as EMBL: #AB008370.

The raw starch degrading enzyme may also be a hybrid alpha-amylase comprising a starch-binding domain (SBD) and an alpha-amylase catalytic domain (CD). A hybrid alpha-amylase may also comprise an alpha-amylase catalytic domain (CD), a starch binding domain (SBD), and a linker connecting the CD and SBD, as is known in the art. In an embodiment the catalytic domain is derived from a strain of *Aspergillus kawachii*. Examples of hybrid alpha-amylases include the ones disclosed in WO 2005/003311, U.S. Patent Publication no. 2005/0054071 (Novozymes), and U.S. Pat. No. 7,326,548 (Novozymes). Examples also include those enzymes disclosed in Table 1 to 5 of the examples in U.S. Pat. No. 7,326,548, and in U.S. Patent Publication no. 2005/0054071 (Table 3 on page 15), such as, an *Aspergillus niger* alpha-amylase catalytic domain (CD) with *Aspergillus kawachii* linker and starch binding domain (SBD).

Other acid alpha-amylase include the enzymes disclosed in WO 2004/020499 and WO 2006/06929 and the enzymes disclosed in WO 2006/066579 as SEQ ID NO:2 (hybrid *A. niger* alpha-amylase+CBM), SEQ ID NO:3 (JA126), or SEQ ID NO:4 (JA129). Hybrid alpha-amylase consisting of *Rhizomucor pusillus* alpha-amylase with *Aspergillus niger* glucoamylase linker and SBD disclosed as V039 in Table 5 in WO 2006/069290.

Raw starch degrading glucoamylases include certain *Aspergillus* glucoamylases, in particular *A. niger* G1 or G2 glucoamylase (Boel et al. (1984), EMBO J. 3 (5), p. 1097-1102), or variants thereof, such as those disclosed in WO 92/00381, WO 00/04136 and WO 01/04273 (from Novozymes, Denmark); the *A. awamori* glucoamylase disclosed in WO 84/02921, *A. oryzae* glucoamylase (Agric. Biol. Chem. (1991), 55 (4), p. 941-949), or variants or fragments thereof. Other raw starch degrading glucoamylases include the glucoamylase derived from a strain of *Athelia*, preferably a strain of *Athelia rolfsii* (previously denoted *Corticium rolfsii*) (see U.S. Pat. No. 4,727,026 and (Nagasaka, Y. et al. (1998) "Purification and properties of the raw-starch-degrading glucoamylases from *Corticium rolfsii*, Appl Microbiol Biotechnol 50:323-330), *Talaromyces* glucoamylases, in particular derived from *Talaromyces emersonii* (WO 99/28448), *Talaromyces leycettanus* (U.S. Pat. No. Re. 32,153), *Talaromyces duponti*, *Talaromyces thermophilus* (U.S. Pat. No. 4,587,215), *Trichoderma reesei* glucoamylases disclosed as SEQ ID NO: 4 in WO 2006/060062, and the glucoamylase derived from *Humicola grisea* disclosed as SEQ ID NO: 3 in U.S. Ser. No. 10/992,187. Other raw starch degrading glucoamylases include glucoamylase derived from a strain of *Trametes*, preferably a strain of *Trametes cingulata* disclosed in WO 2006/069289. Other raw starch degrading glucoamylases include the glucoamylases disclosed in WO 2005/045018. Specific examples include the hybrid glucoamylase disclosed in Table 1 and 4 of Example 1.

Bacterial raw starch degrading glucoamylases include glucoamylases from the genus *Clostridium*, in particular *C. thermoamylolyticum* (EP 135,138), and *C. thermohydrosulfuricum* (WO 86/01831).

Commercially available raw starch degrading enzyme compositions include SP288, SPIRIZYME® ULTRA, GOLDCRUST® and SACZYME® (available from Novozymes A/S).

In a particular embodiment, raw starch degrading enzymes comprising or consisting of a sequence identity of at least 65%, particularly at least 70%, e.g. at least 75%, more particularly at least 80%, such as at least 85%, even more particularly at least 90%, most particularly at least 95%, e.g. at least 96%, such as at least 97%, and even most particularly at least 98%, such as at least 99% to any of the above-listed raw starch degrading enzymes are also useful within the scope of the present invention. The degree of sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labeled "longest identity" (obtained using the –nobrief option) is used as the percent identity and is calculated as follows:

(Identical Residues×100)/(Length of Alignment–
Total Number of Gaps in Alignment)

Examples of raw starch degrading enzymes include variants of the above-listed raw starch degrading enzymes. Examples of variants of the above-listed raw starch degrading enzymes include variants, which have one or more conservative amino acid substitutions.

The raw starch degrading enzyme is added in an amount effective to improve the shelf life of the flat bread products. In one embodiment, the one or more raw starch degrading enzyme is added in an amount effective to retard the staling of the flat bread products. In one embodiment, the raw starch degrading enzyme is added in an amount effective to prevent the negative properties resulting from the treatment with another enzyme. An acid alpha-amylase, for example, may be added to the dough in an amount of 0.1 to 100 AFAU/kg flour, such as, 1 to 5 AFAU/kg flour, 0.5 to 3 AFAU/kg flour, and 0.3 to 2 AFAU/kg flour. A glucoamylase, for example, may be added to the dough in an amount of 0.2-70 AGU/kg flour, preferably 1-50 AGU/kg flour, especially between 5-40 AGU/kg flour.

In one embodiment, the raw starch degrading enzyme may be added to flour or dough in an amount of 0.1-10,000 ppm, for example 1-5000 ppm, 1-2000 ppm, 100-2000 ppm, 250-2000 ppm, 500-2000 ppm, 750-2000 ppm, 1000-2000 ppm, 1250-2000 ppm, 1500-2000 ppm, 1-1500 ppm, 100-1500 ppm, 250-1500 ppm, 500-1500 ppm, 750-1500 ppm, 1000-1500 ppm, 1250-1500 ppm, 1-1250 ppm, 100-1250 ppm, 250-1250 ppm, 500-1250 ppm, 750-1250 ppm, 1000-1250 ppm, 1-1000 ppm, 100-1000 ppm, 250-1000 ppm, 500-1000 ppm, 750-1000 ppm, 1-750 ppm, 100-750 ppm, 250-750 ppm, or 500-750 ppm. The dosage of the raw starch degrading enzyme should be adapted to the nature and composition of the flour or dough in question.

Enzyme Treatment

The enzyme is added to the flat bread dough ingredients (i.e., and prior to baking or freezing the dough), e.g., indirectly to the dough by adding it to flour used to prepare the dough or actually directly to the dough itself. Thus, for example, in one particular embodiment, the raw starch degrading enzyme used to treat the flat bread dough is the amylase of SEQ ID NO:3 of WO 2006/066579 (JA126). Other exemplary raw starch degrading enzymes, such as, e.g., a raw starch degrading enzyme from *Talaromyces* (e.g., *Talaromyces emersonii*), a raw starch degrading enzyme from *Aspergillus* (e.g., *Aspergillus niger* or *Aspergillus oryzae*), a raw starch degrading enzyme from *Rhizomucor* (e.g., *Rhizomucor pusillus*), a raw starch degrading enzyme from *Athelia* (e.g., *Atheilia rolfsii*), or a raw starch degrading enzyme from *Trametes* (e.g., *Trametes cingulata*), or combinations thereof, can be used. The raw starch degrading enzymes may be selected from the group consisting of the amylase of SEQ ID NO:3 of WO 2006/066579 (JA126), the amylase of SEQ ID NO:2 of WO 2006/066579, the *Aspergillus niger* acid alpha-amylase of SEQ ID NO:1 of U.S. Pat. No. 7,244,597, and/or the glucoamylase derived from *Trametes cingulata* as disclosed in WO 2006/069289, or a combination thereof.

The enzymes may be added to flour or dough in any suitable form, such as, e.g., in the form of a liquid, in particular a stabilized liquid, or it may be added to flour or dough as a substantially dry powder or granulate. Granulates may be produced, e.g. as disclosed in U.S. Pat. Nos. 4,106,991 and 4,661,452. Liquid enzyme preparations may, for instance, be stabilized by adding a sugar or sugar alcohol or lactic acid according to established procedures.

Other enzyme stabilizers are well-known in the art. The enzyme combination treatment may be added to the flat bread dough ingredients in any suitable manner, such as individual components (separate or sequential addition of the enzymes) or addition of the enzymes together in one step or one composition.

In addition to the enzyme treatment of the present invention, one or more additional enzymes may be added to the dough. Examples of such one or more additional enzymes include pentosanases, lipolytic enzymes (e.g., lipases, phospholipases, galactolipases), xylanases, proteases, transglutaminases, cellulytic (e.g, cellulases and hemicellulases), acyltransferases, protein disulfide isomerases, pectinases, pectate lyases, oxidoreductases or oxidases (e.g., a peroxidase, a laccase, a glucose oxidase, a pyranose oxidase, a hexose oxidase, a lipoxygenase, an L-amino acid oxidase or a carbohydrate oxidase, and/or sulfurhydryl oxidase), non-raw starch degrading alpha-amylases, non-raw starch degrading glucoamylases, and maltogenic alpha-amylases. The one or more additional enzymes may be of any origin, including mammalian, plant, and preferably microbial (bacterial, yeast or fungal) origin and may be obtained by techniques conventionally used in the art. The one or more additional enzymes enzyme may be applied to the dough in any suitable form, such as, in liquid form or in dry or substantially dry form.

Particular combinations of enzymes include the enzyme treatment of the present invention combined with one or more enzymes selected from the group consisting of a lipase, phospholipase, galactolipase, xylanase, protease, oxidase, non-raw starch degrading amylase, non-raw starch degrading glucoamylase and a maltogenic alpha-amylase. As is known in the art, lipolytic enzymes may combine many different activities into one enzyme. An example of such lipolytic enzymes are the enzymes disclosed in WO 98/26057 and WO 00/32758 (Novozymes A/S).

The dough may also comprise other conventional ingredients, e.g., one or more emulsifiers. Emulsifiers serve to improve dough extensibility and may also be of some value for the consistency of the resulting flat bread, making it easier to slice, as well as for its storage stability. Examples of suitable emulsifiers are mono- or diglycerides, polyoxyethylene stearates, diacetyl tartaric acid esters of monoglycerides, sugar esters of fatty acids, propylene glycol esters of fatty acids, polyglycerol esters of fatty acids, lactic acid esters of monoglycerides, acetic acid esters of monoglycerides, lecithin or phospholipids, or ethoxylated monoglycerides. Particular emulsifiers include monoglycerides, diacetyl tartaric acid esters of monoglyceride (DATEM) and sodium stearoyl lactylate (SSL).

Other conventional ingredients include proteins, such as milk powder, gluten, and soy; eggs (either whole eggs, egg yolks or egg whites); an oxidant such as ascorbic acid, potassium bromate, potassium iodate, azodicarbonamide (ADA), ammonium persulfate or potassium persulphate; an amino acid such as L-cysteine; a sugar; a salt such as sodium chloride, calcium acetate, sodium sulfate or calcium sulfate, diluents such silica dioxide, starch of different origins. Still other convention ingredients include hydrocolloids such as CMC, guar gum, xanthan gum, locust bean gum, etc. Modified starches may be also used.

Pre-Mixes

It will often be advantageous to provide the enzymes used in the treatment of the present invention in admixture with other ingredients used to improve the properties of flat bread products. These are commonly known in the art as "pre-mixes," which usually comprise flour. Hence, in a further aspect, the present invention relates to a flat bread premix for improving the quality of dough used to prepare a flat bread product or flat bread products, which premix comprises one or more raw starch degrading enzymes in combination with one or more flat bread or dough ingredients, e.g., the ingredients described above. The pre mix composition may be in liquid form or dry or substantially dry form.

In one embodiment, the present invention further relates to a flat bread pre-mix comprising the enzyme combinations of the present invention and flour, such as, flour from grains, such as, wheat flour, corn flour, rye flour, barley flour, oat flour, rice flour, or sorghum flour, and combinations thereof. In another embodiment, the present invention relates to a flat bread pre-mix comprising the enzyme combinations of the present invention and flour, such as, flour from grains, such as, wheat flour, corn flour, rye flour, barley flour, oat flour, rice flour, sorghum, soy flour or flour from pulses like gram flour, and combinations thereof, and one or more additional enzymes, as previously described.

Dough and Flat Bread Properties

In one embodiment, the flat bread prepared by the methods and compositions of the invention provides improved storage properties. The flat bread prepared by the methods and compositions of the present invention are used as anti-staling agents to improve the shelf life of the flat bread product. The anti-staling effect (and improved shelf life) of a flat bread product can be determined by a number of methods well known in the art.

Primarily anti-staling effectiveness is measured by the hardness (also referred to as "firmness" and the opposite of "softness") of the flat bread product. Hardness can be measured using a texture profile analyzer. Texture measurements for flat bread such as tortilla can be measured according to methods known in the art as disclosed in e.g., Gomez-Mendez et al. "Instrumental and sensory techniques for the measurement of wheat tortilla texture." IFT Conference Paper, New Orleans (1996) and Mao, "Texture measurements of commercially available wheat flour tortillas." Poster presented at IFT Annual Meeting, Dallas, USA (Jun. 10-14, 2000).

Besides hardness/softness, stickiness, extensibility and elasticity are also important quality parameters for flat bread. Other important properties include rollability, foldability, flexibility, layering, bite and/or texture. Non-limiting examples of general methods for evaluating such parameters are set forth in the "Materials and Methods" section below.

Other tests known in the art may be used to assess the shelf life and other organoleptic qualities of the flat bread prepared by the methods and compositions of the present invention.

Storage/Shelf Life

In one embodiment, the present invention relates to a flat bread having an improved shelf life at at least 1 hour after baking. In one embodiment, the present invention relates to a flat bread having an improved shelf life at at least 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours or 23 hours after baking. In one embodiment, the present invention relates to a flat bread having an improved shelf life at at least 24 hours after baking. In another embodiment, the present invention relates to a flat bread having an improved shelf life at at least 48 hours after baking. In another embodiment, the present invention relates to a flat bread having an improved shelf life at at least 72 hours after baking. In another embodiment, the present invention relates to a flat bread having an improved shelf life at at least 96 hours after baking. In another embodiment, the present invention relates to a flat bread having an improved shelf life at at least 120 hours after baking. In another embodiment the present invention relates to a flat bread having an improved shelf life at at least 6 days, 7 days, 8 days, 9 days, 10 days, 11 days, 12 days, 13 days, 14 days, 15 days, 16 days, 17 days, 18 days, 19 days, 20 days or 21 days after baking.

Shelf life can measured as follows: A flat bread is prepared using enzyme compositions of the present invention (i.e., one or more raw starch degrading enzymes) and compared to a control flat bread, that is, a flat bread prepared in the same way but without enzyme compositions of the present invention. The flat bread is stored in a sealed plastic bag at 25° C. After the storage period, (e.g., 1 hour, 24 hours, 48 hours, 72 hours, 96 hours, 7 days, 21 days etc.), the hardness of the flat bread is measured using a texture analyzer and compared to a control flat bread stored under identical conditions. An improved shelf life is defined as a flat bread which is less hard (i.e., softer) than the control as measured by the texture analyzer.

In addition to preparing fresh flat bread dough or flat bread products, the present invention is directed to a method for preparing flat bread dough that can be stored, e.g., at room temperature or with refrigeration, or frozen prior to baking. The dough can stored and/or frozen after preparation of the dough and treatment by the enzyme combinations of the present invention (i.e., prior to baking) for 1 hour, 24 hours, 48 hours, 72 hours, 96 hours, 5 days, 6 days, 7 days, 8 days, 9 days, 10 days, 11 days, 12 days, 13 days, 14 days, 15 days, 16 days, 17 days, 18 days, 19 days, 20 days, 21 days etc.

In one embodiment, the flat bread is also compared to a control and other enzymes treatments in other quality parameters, such as, stickiness, extensibility, elasticity, rollability, foldability, flexibility, layering, bite and texture. The flat bread prepared by the enzyme treatment of the present invention is analyzed at a time after baking or during storage (e.g., 1 hour after baking and/or 24 hours, 48 hours, 72 hours, 96 hours, 7 days, 21 days etc. post baking). The flat bread prepared by the enzyme treatment of the present invention preferably has similar qualities in terms of improved stickiness, extensibility, elasticity, rollability, flexibility, foldability, layering, bite and/or texture as compared to the control at the comparison, such as, as measured using a texture analyzer and/or by sensory evaluation. The flat bread prepared by the enzyme treatment of the present invention preferably has improved qualities in terms of improved stickiness, extensibility, elasticity, rollability, flexibility, foldability, layering, bite and/or texture as compared to treatment with other anti-staling enzymes. The flat bread may be prepared with other background enzymes. The above method may also be used to compare the effectiveness of one particular enzyme treatment of the present invention to another enzyme treatment of the present invention.

The invention described and claimed herein is not to be limited in scope by the specific embodiments herein disclosed, since these embodiments are intended as illustrations of several aspects of the invention. Any equivalent embodiments are intended to be within the scope of this invention as well as combinations of one or more of the embodiments. Various modifications of the invention in addition to those shown and described herein will become apparent to those skilled in the art from the foregoing description. Such modifications are also intended to fall within the scope of the appended claims.

Various references are cited herein, the disclosures of which are incorporated by reference in their entireties. The present invention is further described by the following examples which should not be construed as limiting the scope of the invention. For example, routine modifications to optimize the methods of enzymatic modification according to the present invention are contemplated.

EXAMPLES

Materials and Methods

The following are non-limiting examples of methods for producing tortilla, an exemplary flat bread.

Ingredients are mixed at one time or in three steps. In the latter method, dry ingredients are mixed, followed by addition of shortening and further mixing. Water is then added followed by further mixing to obtain dough.

Sample Evaluation

Before analysis, flat bread is cooled to room temperature and stored immediately in a plastic bag and sealed until analysis, unless otherwise specified. The effect of raw starch degrading enzymes is analyzed.

The enzymes are dissolved in water and added to flour just before mixing. All enzymes are dosed on the basis of flour weight, and flat bread is prepared in a method as described above.

Sensory Evaluation

To perform sensory evaluation, a panel (e.g., at least three well-trained persons) is used to assess the qualities of the flat bread. A piece of flat bread is broken into two halves and the crumb of which is compared to that of a blank control (without enzyme). When tasting a small piece of crumb is taken, put into mouth and bitten carefully to evaluate its gumminess or stickiness and resilience. A 10-point system based on the Table below may be used to score the quality parameters of interest with the score of the control being 5. The higher the score, the better the quality of flat bread. For the sensory evaluation of fresh flat bread, the flat bread is cooled down, and then sensory evaluation is performed. Sensory evaluation can also be performed at any other designated time, e.g., 1 hour post baking, 24 hours post baking, 48 hours post baking, 72 hours post baking, 96 hours post baking, 7 days post baking, 21 days post baking, etc.

TABLE

| Crumb | | | |
|---|---|---|---|
| Uniformity | 0/Less | 5 Reference | 10/More |
| Cell Wall | 0/Thick | 5 Reference | 10/Thin |
| Grain | 0/Open | 5 Reference | 10/Fine |
| Mouth feel | | | |
| Resilience | 0/less | 5 Reference | 10/more |
| Stickiness | 0/more | 5 Reference | 10/less |

Raw Starch Degrading Enzyme (Ra/Ga) Assay

A protocol to obtain a raw starch degrading enzyme index (Ra/Ga) value of the enzymes is as follows:

1) The assays are performed at a temperature of 40° C.

2) First, the pH profile of the enzyme is obtained on raw starch. The profile is obtained from the plotting of the % activity versus the pH. This optimum pH value is used in the assay.

3) Any type of starch may be used, such as, wheat, corn, barley, rice, etc. In an example, the raw starch used is corn starch. A 2% solution of raw starch is used. Alternatively, to obtain the gelatinized starch solution, a solution of raw starch is heated above the gelatinization temperature for at least 60 minutes. In the case of corn, the solution of raw starch is heated to 70° C. for at least 60 minutes.

4) The reaction solution contains the gelatinized starch (or raw starch) and a buffer. The composition of the buffer used in the assay depends on the pH optimum of the enzyme. The buffer composition and concentration must be identical for both the raw and gelatinized starch activity measurements.

5) The enzyme concentration used in the assay must be identical for both the raw and gelatinized starch activity measurements.

6) The enzyme activity is measured by determination of the reducing sugars in solution. Suitable methods are the following: The method of Bernfield for determining reducing sugars using dinitrosalicylic acid is described in Bernfield P., Methods Enzymology 1, 149-158 (1955) and the method for determining reducing sugars with copper-bicinchoninate as described in Fox J. D. et al, Analytical Biochemistry 195,93-96 (1991) or in Waffenschmidt S. et al, Anal. Biochem. 165,337-340 (1987). Prior to the determination of reducing sugars, the solutions are boiled for 3 minutes and centrifugated to inactivate the enzyme.

7) The time for incubation to measure the enzyme activities is 6 hours.

8) The enzyme activity is expressed as the number reducing sugars produced per hour and per mg of pure active enzyme.

9) The activity on gelatinized starch is measured by measuring the release of glucose produced by the enzyme on a 2% gelatinized (e.g., corn) starch reaction mixture and the activity on raw starch is measured by measuring the release of glucose produced by the enzyme on a 2% raw (e.g., corn) starch reaction mixture. The activity is measured by the release of reducing sugars produced in 4 mol per hour per mg of pure active enzyme.

Enzymes

Exemplary raw starch degrading enzyme (JA126) (SEQ ID NO: 1): The amino acid sequence is given as SEQ ID NO:3 in WO 2006/066579, *Rhizomucor pusillus* amylase with linker and starch binding domain from *A. rolfsii*.

Traditional maltogenic alpha-amylase (NOVAMYL®): This enzyme is commercially available from Novozymes A/S under the tradename NOVAMYL®. One MANU (Maltogenic Amylase Novo Unit) may be defined as the amount of enzyme required to release one pmol of maltose per minute at a concentration of 10 mg of maltotriose (Sigma M 8378) substrate per ml of 0.1 M citrate buffer, pH 5.0 at 37° C. for 30 minutes.

Evaluation of Tortilla

The following parameters are useful in evaluating tortilla herein:

Dough attributes: Reference dough is (dough 1) given a rating of 5.0. Dough variables that receive a higher value than 5.0 are higher in that particular attribute than reference. Dough variables that receive a lower value have less of that attribute than reference.

Rollability: The smallest sized wooden dowel in diameter that the tortilla can be rolled around without cracking. The largest dowel is 1 inch in diameter and decreases in ⅛ increments to ⅜ of an inch.

Folding: Tortilla is folded in half and then into quarters. Cracking along the creases are observed. The reference is rated 5.0. Product with a higher number shows less cracking (better folding ability); product with a lower number shows more cracking (worse folding ability).

Flexibility: Tortilla is draped over the 1 inch dowel. Again the control is rated as 5.0. Tortillas with a higher number show a better draping effect; those with a lower number are more rigid.

Layering: Tortilla is torn in half to reveal the cross-sectional structure of the interior. With the control rated as a 5.0, tortillas with a higher number show more discreet layering, those with a lower number show less.

Bite: Tortillas with a higher rating than control are softer, more tender. Those with a lower number are tougher and firmer.

Texture: A general, non specific rating of eating quality. Tortillas with a higher rating than control exhibit a more pleasant eating quality; those with a lower value have more sensory defects.

Evaluation of Chapatti

The following parameters are useful in evaluating Chapatti herein:

Toughness: is maximum force in gram needed to break the Chapattis. The greater the force required to stretch the sample, the tougher the sample is.

Extensibility: is the distance in mm at break. The greater the distance at break point the more extensible the sample is.

Toughness and extensibility are both important in evaluating Chappati. If the Chapatti has a dry surface, the toughness might be high due to a hard surface, but the extensibility will then be low. Toughness and extensibility are extracted from TA.XT2 measurements using a "Tortilla Burst Rig" and a 1" spherical compression probe. Low toughness and low extensibility are together desirable in chapattis. Higher force value and lower extensibility together shows increased toughness and brittleness of chapattis.

The following visual and organoleptic parameters are also useful in evaluating Chapatti herein:

Appearance: Many blisters that are light brown are wanted and a huge quality parameter. It should be visible that the Chapatti has puffed up during baking.

Hand feeling: Chapattis should be foldable/pliable. When a Chapatti is ripped it should not make a lot of crumbles. Smooth is desirable; Rough is undesirable.

Mouth feeling: A Chapatti should be easy to chew and bite.

Puffing: Full is desirable; Partial or absence of puffing is undesirable.

Pliability: Highly pliable is desirable; Less pliable is undesirable.

Colour: Light brown is desirable; Dark brown, whitish is undesirable.

Spots: Light brown and evenly distributed is desirable; Dark brown, unevenly distributed is undesirable.

Eating quality: Soft, easy to chew is desirable; Chewy, doughy is undesirable.

Chapattis are served warmed at home, using, e.g., a microwave oven or a plate or stored hot immediately after cooking in insulated box till consumed.

Example 1

Tortilla dough is prepared containing the following ingredients:

| Ingredient | Amount (grams) | % |
|---|---|---|
| Flour, Wigwam | 1080.0 | 100.0 |
| Water | 561.6 | 52.0 |
| Baking Powder | 27.0 | 2.5 |
| AP Shortening | 129.6 | 12.0 |
| Calcium Propionate | 5.4 | 0.5 |
| Sugar, Granulated | 21.6 | 2.0 |
| Salt | 21.6 | 2.0 |
| Potassium Sorbate | 0.5 | 0.05 |
| Fumaric Acid | 1.1 | 0.1 |

Enzyme is included as in Table 1.

TABLE 1

| | Dough | | | | | | |
|---|---|---|---|---|---|---|---|
| | 1 | 2 | 3 | 4 | 5 | 6 | 7 |
| NOVAMYL ®* (MANU/kg flour) | — | — | — | — | 750 | 750 | 750 |
| JA126 (ppm based on flour weight) | — | 1000 | 2000 | 5000 | — | 1000 | 2000 |

*NOVAMYL ® 1500 MG, 1718 U/g

Dough is mixed and allowed to rest 30 minutes prior to dividing/rounding. After rounding, dough is rested an additional 10 minutes. Dough balls are pressed into discs on a DoughPro press at 300° F. top and platen temperatures. The discs obtained are then gridled for 30 seconds per side at 450° F.

Evaluation of parameters of dough after mixing is shown in Table 2.

TABLE 2

| | Dough | | | | | | |
|---|---|---|---|---|---|---|---|
| | 1 | 2 | 3 | 4 | 5 | 6 | 7 |
| Stickiness | 5.0 | 6.0 | 7.0 | 7.0 | 5.0 | 6.0 | 7.0 |
| Softness | 5.0 | 6.0 | 7.0 | 7.0 | 5.0 | 6.0 | 7.0 |
| Extensibility | 5.0 | 6.0 | 6.0 | 6.0 | 5.0 | 6.0 | 6.0 |
| Elasticity | 5.0 | 4.0 | 4.0 | 4.0 | 5.0 | 4.0 | 4.0 |

Evaluation of parameters of tortillas after baking is shown in Tables 3-6. Tables 3-4 show parameters on day one after baking. Table 5 shows parameters 7 days after baking; table 6, 21 days after baking.

TABLE 3

| | Evaluation 1 day after baking | | | | | | |
|---|---|---|---|---|---|---|---|
| | Dough | | | | | | |
| | 1 | 2 | 3 | 4 | 5 | 6 | 7 |
| Weight of 6 tortillas (g) | 267.0 | 267.0 | 287.0 | 279.0 | 267.0 | 273.0 | 275.0 |
| Height of 6 tortillas (mm) | 15.0 | 15.0 | 13.0 | 10.0 | 15.0 | 12.0 | 11.0 |
| Avg. diameter of 6 tortillas (cm) | 20.5 | 20.5 | 21.0 | 20.0 | 20.0 | 21.0 | 21.0 |
| Avg. weight (g) | 44.5 | 44.5 | 47.8 | 46.5 | 44.5 | 45.5 | 45.8 |
| Avg. height (mm) | 2.5 | 2.5 | 2.2 | 1.7 | 2.5 | 2.0 | 1.8 |
| Avg. diameter (cm) | 20.5 | 20.5 | 21.0 | 20.0 | 20.0 | 21.0 | 21.0 |
| Height index % | 100.0 | 100.0 | 86.7 | 66.7 | 100.0 | 80.0 | 73.3 |
| Diameter index % | 100.0 | 100.0 | 102.4 | 97.6 | 97.6 | 102.4 | 102.4 |
| Weight/diameter ratio (g/cm) | 2.2 | 2.2 | 2.3 | 2.3 | 2.2 | 2.2 | 2.2 |
| Weight/height ratio (g/mm) | 17.8 | 17.8 | 22.1 | 27.9 | 17.8 | 22.8 | 25.0 |

TABLE 4

| | Evaluation 1 day after baking | | | | | | |
|---|---|---|---|---|---|---|---|
| | Dough | | | | | | |
| | 1 | 2 | 3 | 4 | 5 | 6 | 7 |
| Sticking | N | N | Y | N | N | N | N |
| Color | Not evaluated | Not evaluated | Not evaluated | Not evaluated | Not evaluated | Not evaluated | Not evaluated |
| Rollability | Smallest dowel | Smallest dowel | Smallest dowel | Smallest dowel | Smallest dowel | Smallest dowel | Smallest dowel |
| Folding | Not evaluated | Not evaluated | Not evaluated | Not evaluated | Not evaluated | Not evaluated | Not evaluated |
| Flexibility | 5.0 | 7.0 | 8.0 | 9.0 | 5.0 | 7.0 | 8.0 |
| Layering | 5.0 | 3.0 | 2.0 | 1.0 | 5.0 | 3.0 | 2.0 |
| Bite | 5.0 | Not evaluated | Not evaluated | Not evaluated | Not evaluated | Not evaluated | Not evaluated |
| Texture | Not evaluated | Not evaluated | Not evaluated | Not evaluated | Not evaluated | Not evaluated | Not evaluated |

TABLE 5

| | Evaluation 7 days after baking | | | | | | |
|---|---|---|---|---|---|---|---|
| | Dough | | | | | | |
| | 1 | 2 | 3 | 4 | 5 | 6 | 7 |
| Sticking | N | Y | N | N | N | N | N |
| Color | 5.0 | 4.0 | 3.0 | 2.0 | 5.0 | 4.0 | 3.0 |
| Rollability | Smallest Dowel | Smallest Dowel | Smallest Dowel | Smallest Dowel | Smallest Dowel | Smallest Dowel | Smallest Dowel |
| Folding | 5.0 | 6.0 | 7.0 | 7.0 | 5.0 | 7.0 | 7.0 |
| Flexibility | 5.0 | 8.0 | 9.0 | 9.0 | 5.0 | 8.0 | 9.0 |
| Layering | 5.0 | 4.0 | 3.0 | 2.0 | 5.0 | 4.0 | 3.0 |
| Bite | 5.0 | 7.0 | 7.0 | 8.0 | 5.0 | 7.0 | 7.0 |
| Texture | 5.0 | 6.0 | 4.0 | 3.0 | 5.0 | 4.0 | 3.0 |

TABLE 6

| | Evaluation 21 days after baking | | | | | | |
|---|---|---|---|---|---|---|---|
| | Dough | | | | | | |
| | 1 | 2 | 3 | 4 | 5 | 6 | 7 |
| Sticking | N | N | N | N | N | N | N |
| Color | 5.0 | 6.0 | 7.0 | 7.0 | 5.0 | 6.0 | 6.0 |
| Rollability | Large Dowel | Smallest Dowel | Smallest Dowel | Smallest Dowel | Large Dowel | Smallest Dowel | Smallest Dowel |
| Folding | 5.0 | 6.0 | 7.0 | 7.0 | 5.0 | 6.0 | 7.0 |
| Flexibility | 5.0 | 8.0 | 9.0 | 9.0 | 5.0 | 8.0 | 9.0 |
| Layering | 5.0 | 4.0 | 3.0 | 2.0 | 5.0 | 4.0 | 3.0 |

TABLE 6-continued

Evaluation 21 days after baking

| | Dough | | | | | | |
|---|---|---|---|---|---|---|---|
| | 1 | 2 | 3 | 4 | 5 | 6 | 7 |
| Bite | Too old to eat | Too old to eat | Too old to eat | Too old to eat | Too old to eat | Too old to eat | Too old to eat |
| Texture | Too old to eat | Too old to eat | Too old to eat | Too old to eat | Too old to eat | Too old to eat | Too old to eat |

* Too old to eat = product turned moldy

Compared to control and/or NOVAMYL®, the use of JA126 leads to improved storage properties of the resulting tortilla.

At the time of pressing, tortillas produced from doughs 2-4 with JA126 felt softer and stickier than reference dough 1. Stickiness reached its maximum at 2000 ppm of JA126. Toast points increased with dosage of JA126. Tortilla produced from dough 4 with 5000 ppm JA126 seemed to become more translucent and seemed to collapse (as indicated by decrease in stack height with increased enzyme dose).

After 1-2 days, there is a definite texture difference between JA126-containing samples and reference. Flexibility increased with increasing enzyme dosage in all JA126-containing tortillas compared to control.

At 1000 ppm JA126, analysis of eating quality revealed a slight gummy sensation. At levels of 2000 to 5000 ppm JA126, texture was doughy. There was a perceived sweetness at 2000 ppm and a noticeable sweetness at 5000 ppm.

In contrast, addition of NOVAMYL® had no effect, positive or negative.

Example 2

Chapatti dough is prepared containing the following ingredients:

| Ingredient | Amount (grams) |
|---|---|
| Commercially available whole wheat flour | 667 |
| Water | 467 |
| Salt | 10.5 |
| Soy oil | 29 |
| Calcium propionate | 2.25 |

Note:
Calcium propionate is only added to the Chapattis, which are stored at room temperature for up to 7 days.

Enzyme: 7000 MANU of NOVAMYL, CE-2008-00190, having activity 8710 MANU/g or 750 µL of JA126, CE-2005-00215, having activity of 16.8 mg/mL.

Water is added to the above mentioned ingredients and mixed on a Bear Mixer at "2" (low speed) for 2 min. Then the speed is raised to "3½" (high speed) for 3 min. Resting time: 2 min. while scaling and measuring temperature. The dough is divided into 30 rolls and is rested for 5 min. before pressing and baking. The dough is pressed in a Pizza Press at 150° C. for 0.3 sec at the highest distance setting. Baking is done on a hot plate at 200° C. The Chapattis are cooled for 30 min. before packing, 3×10, in plastic bags for evaluation.

Series 1: Chapattis are baked according to the recipe shown above. The Chapattis are measured on the Texture Analyzer using a round compression probe. Measurements are made 1 hour, 4 hours, 1 day and 6 days after baking and cooling of the Chapattis. 7 to 8 number of replicates are measured per treatment.

Series 2: Chapattis are baked according to the recipe shown above. 15 number of replicates are baked, sealed in plastic bags and stored in cold room (4° C.) for 7 days. Another 15 number of replicates are pressed, layered with Silicone paper sealed in plastic bags and stored in cold room (4° C.) for 7 days. After 7 days the Chapattis are baked and cooled and then measured 30 minutes after baking. The Chapattis are measured on the Texture Analyzer using a round compression probe.

Series 1:

No mould was observed on the Chapattis after 6 days of storage at room temperature (~23° C.). All the Chapattis seemed dry after 6 days of storage, but already after 24 hours a difference was observed (Table 7).

TABLE 7

Evaluation of the baked Chapattis by hands after 1 hour, 4 hours, 1 day and 6 days

| | Feeling by hands | | |
|---|---|---|---|
| | Control | Novamyl | JA126 |
| 1 hour | soft dry surface | very soft | very soft |
| 4 hours | soft dry edges sticks together | very soft sticks together | very soft sticks together |
| 1 day | soft sticks together | soft sticks together | soft dry feeling sticks together |
| 6 day | dry | dry | dry |

From the Texture Analyzer (TA-XT2) measurements toughness and extensibility of the Chapattis are obtained. A soft Chapatti is preferred, without being sticky, doughy and extensible.

In Table 8, the toughness of the baked Chapattis stored for 1 hour, 4 hours, 1 day and 6 days is shown, and it is seen the control with no enzyme added is less tough at beginning of the experiment, but after 4 hours the levels are the same as for Chapattis added an enzyme.

TABLE 8

Toughness

| | Approximate force (g) | | | |
|---|---|---|---|---|
| | 1 hour | 4 hours | 1 day | 6 days |
| Control (No enzyme) | 850 | 1425 | 1300 | 650 |
| Novamyl-treated Chapatti | 1350 | 1300 | 825 | 650 |

TABLE 8-continued

| | Toughness | | | |
|---|---|---|---|---|
| | Approximate force (g) | | | |
| | 1 hour | 4 hours | 1 day | 6 days |
| JA126-treated Chapatti | 1425 | 1325 | 1975 | 800 |

After 4 hours of storage there is an increase in the toughness of control chapatti but Novamyl and JA 126 shows decrease in the toughness compared to control. The percent reduction in toughness with JA126 after 4 hours is substantial compared to 1 hour and to Novamyl. Following 1 day of storage at room temperature the Chapattis added Novamyl are less tough than all other Chapattis, whereas for the Chapattis added JA126, the toughness increases after 1 day of storage.

The extensibility measurements, shown in Table 9, indicate the same tendencies as for toughness, except that the control is as extensible after 1 hour than the other Chapattis.

TABLE 9

| | Extensibility | | | |
|---|---|---|---|---|
| | Approximate distance (mm) | | | |
| | 1 hour | 4 hours | 1 day | 6 days |
| Control (No enzyme) | 31 | 34 | 25 | 12 |
| Novamyl-treated Chapatti | 37 | 35 | 20 | 14 |
| JA126-treated Chapatti | 38 | 32.5 | 30 | 14 |

Series 2:

No mould was seen on the Chapattis when stored cold and following observations were made after reheating:

The unbaked Chapattis seemed very dry, and they got a crispy surface after baking The baked Chapattis stored cold, where tempered for a few hours before measurements and seemed nice and soft.

From Table 10, Chapattis made with without any enzyme or with Novamyl shows increase in the toughness after baking except for chapattis made with JA126. For JA126 no difference is observed between unbaked and baked Chapattis. This could be due to ability of JA126 to act on raw starch and does not require the starch to be gelatinized as seen in Novamyl. Table 10 shows toughness measured with a TA-XT2 for unbaked and baked Chapattis stored at 4° C. for 7 days.

TABLE 10

| Toughness of unbaked and baked Chapattis. | | |
|---|---|---|
| | Approximate force (g) | |
| | Unbaked Chapattis | Baked Chapattis |
| Control (No enzyme) | 875 | 1300 |
| Novamyl-treated Chapatti | 1025 | 1500 |
| JA126-treated Chapatti | 1075 | 950 |

Looking at the extensibility, in Table 11 it is seen that there is an increase in the extensibility of the chapatti after baking in control and in Novamyl treated samples where as the extensibility decreased in JA 126 treated chapattis stored at 4° C. in 7 days.

TABLE 11

| Extensibility of unbaked and baked Chapattis | | |
|---|---|---|
| | Approximate distance (mm) | |
| | Unbaked Chapattis | Baked Chapattis |
| Control (No enzyme) | 18 | 28 |
| Novamyl-treated Chapatti | 27 | 32 |
| JA126-treated Chapatti | 28 | 23 |

It is seen that JA126 shows the opposite trend than Novamyl, both for toughness and extensibility. Without wishing to be bound by theory, it is believed that this is because JA126 is a raw starch hydrolyzing enzyme, which does not need the starch to be gelatinized first and therefore have no further benefit of the heating. The effect of JA126 is more pronounced in frozen chapattis than cooked chapattis stored for 6 days. The usual trend of baked chapatti is to increase toughness and extensibility after cooking though the difference in the percent increase in control and Novamyl treated sample vary the trend is same. However JA126 shows opposite trend. With JA126, the toughness and extensibility both decrease in frozen uncooked chapattis after cooking.

The invention claimed is:

1. A method for preparing a flat bread composition, comprising adding a maltogenic alpha-amylase and one or more raw starch degrading enzymes to a dough used to prepare flat bread, wherein the one or more raw starch degrading enzymes is an alpha-amylase having a sequence identity of at least 90% to SEQ ID NO:1 and wherein the one or more raw starch degrading alpha-amylase is added in an amount of 1-5000 ppm based on flour weight.

2. The method of claim 1, further comprising baking the dough to make flat bread.

3. The method of claim 1, wherein the dough used to prepare the flat bread comprises flour selected from the group consisting of wheat flour, corn flour, rye flour, barley flour, oat flour, rice flour, sorghum flour, and a combination thereof.

4. The method of claim 1, wherein the dough used to prepare the flat bread comprises wheat flour.

5. The method of claim 2, comprising
a) making a dough comprising a maltogenic alpha-amylase and one or more raw starch degrading enzymes,
b) proofing the dough, and
c) baking the dough to prepare a flat bread.

6. The method of claim 2, comprising
a) making a dough comprising a maltogenic alpha-amylase and one or more raw starch degrading enzymes,
b) proofing, sheeting and shaping the dough, and
c) baking the dough to prepare a flat bread.

7. The method of claim 2, wherein the method further comprises the step of packaging the flat bread.

8. The method of claim 2, wherein the flat bread has a softness at 4 hours post baking which is softer when evaluated by texture analyzer than the softness of a flat bread which is prepared under the same conditions, but without treatment with a maltogenic alpha-amylase and one or more raw starch degrading enzymes.

9. The method of claim 2, wherein the flat bread has a softness at 24 hours post baking which is softer when evaluated by texture analyzer than the softness of a flat bread which is prepared under the same conditions, but without treatment with a maltogenic alpha-amylase and one or more raw starch degrading enzymes.

10. The method of claim 2, wherein the flat bread has a softness at 48 hours post baking which is softer when evaluated by texture analyzer than the softness of a flat bread which is prepared under the same conditions, but without treatment with a maltogenic alpha-amylase and one or more raw starch degrading enzymes.

11. The method of claim 1, wherein the flat bread dough is stored for 7 days prior to baking.

12. The method of claim 1, wherein the dough further comprises one or more enzymes selected from the group consisting of pentosanases, lipolytic enzymes, xylanases, proteases, transglutaminases, cellulytic, acyltransferases, protein disulfide isomerases, a pectinases, a pectate lyases, an oxidoreductases or oxidases, alpha-amylases, and glucoamylases.

13. A method for preparing a flat bread composition, comprising adding a maltogenic alpha-amylase and one or more raw starch degrading enzymes to a dough used to prepare flat bread, wherein the one or more raw starch degrading enzymes is an alpha-amylase having a sequence identity of at least 95% to SEQ ID NO:1 and wherein the one or more raw starch degrading alpha-amylase is added in an amount of 1-5000 ppm based on flour weight.

14. The method of claim 1, wherein the one or more raw starch degrading enzymes is an alpha-amylase having a sequence identity of at least 98% to SEQ ID NO:1.

15. The method of claim 1, wherein the one or more raw starch degrading enzymes is an alpha-amylase having a sequence identity of at least 99% to SEQ ID NO:1.

* * * * *